United States Patent
Rekow et al.

(10) Patent No.: US 6,494,371 B1
(45) Date of Patent: Dec. 17, 2002

(54) DIODE-LASER LIGHT PROJECTOR FOR ILLUMINATING A LINEAR ARRAY OF LIGHT MODULATORS

(75) Inventors: Mathew N. Rekow, Santa Cruz; Stephen L. Kwiatkowski, Sunnyvale, both of CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 09/522,120

(22) Filed: Mar. 9, 2000

(51) Int. Cl.[7] .............................. G06K 7/10; G06K 7/14
(52) U.S. Cl. .................. 235/454; 235/462.32; 235/470
(58) Field of Search ........................... 235/454, 462.32, 235/462.35, 462.42, 470, 470.01

(56) References Cited

U.S. PATENT DOCUMENTS

| | | | |
|---|---|---|---|
| 4,826,269 A | 5/1989 | Streifer et al. | 350/3.72 |
| 5,091,636 A * | 2/1992 | Takada et al. | 235/454 |
| 5,504,317 A * | 4/1996 | Takahashi | 235/462 |
| 5,517,359 A | 5/1996 | Gelbart | 359/623 |
| 5,521,748 A | 5/1996 | Sarraf | 359/321 |
| 5,710,418 A | 1/1998 | Tawara | 235/472 |
| 5,967,645 A | 10/1999 | Anderson | 362/259 |
| 5,969,872 A | 10/1999 | Oren et al. | 359/621 |

FOREIGN PATENT DOCUMENTS

EP 0886 162 A2 6/1998 ........... G02B/27/09

OTHER PUBLICATIONS

*IBM Technical Disclosure Bulletin*, "Uniform Line Illumination with Small Area High Radiant Sources," vol. 35, No. 3, Aug. 1992, pp. 414–415.

*Principles of Optics Electromagnetic Theory of Propagation, Interference and Diffraction of Light*, by Max Born & Emil Wolf, Pergamon Press, 6th (corrected) Edition, 1980 (reprinted 1984), Chapter "10.5.2 The influence of the condenser on resolution in a microscope," pp. 522–525.

* cited by examiner

*Primary Examiner*—Thomas M. Sember
*Assistant Examiner*—Jacob Y. Choi
(74) *Attorney, Agent, or Firm*—Stallman & Pollock LLP

(57) ABSTRACT

An illumination system for projecting a line of light includes a linear array of diode lasers having a fast and a slow axis and an optical system aligned with the linear array and having different optical power in the fast and slow axes. The optical system is arranged to focus fast-axis diverging rays from the array in a fast axis focal plane of the optical system, and arranged to form slow axis diverging rays of the array into a plurality of bundles of parallel rays, one for each diode-laser, in the array. The bundles of parallel rays intersect in the fast-axis focal plane, such that light from the diode-lasers is formed into a line of light in the fast-axis focal plane. The line of light has a width in the fast axis and a length in the slow axis. The illuminator is useful as an illuminator for a linear spatial light modulator array.

18 Claims, 5 Drawing Sheets

DIODE-LASER LIGHT PROJECTOR FOR ILLUMINATING A LINEAR ARRAY OF LIGHT MODULATORS

TECHNICAL FIELD OF THE INVENTION

The present invention relates in general to diode-laser light-sources. It relates in general to a light source for projecting light from a linear diode-laser array into an elongated line of light.

DISCUSSION OF BACKGROUND ART

Diode-lasers are commonly used as sources of illumination in various graphics applications such as display systems, optical printing systems and optical recording systems. In one type of prior-art imaging system a linear (one-dimensional) array of light modulators is illuminated by an illuminator including a light source. Illumination from the array of modulators is projected onto a recording medium or the like in the form of a line of images of the modulators. By scanning the recording medium past the line of images and appropriately synchronizing the scanning with operation of the modulator array, the modulator array is used to draw a two-dimensional image on the recording medium.

A preferred light-source for the illuminator is a linear array of diode-lasers commonly referred to as a diode-laser bar. A diode-laser bar can efficiently provide relatively high illumination power, for example 60.0 Watts (W) or more, from a source having a maximum overall dimension no greater than about 10 centimeters (cm). A disadvantage, however, is that each of the diode-lasers in the bar is an individual emitter. This presents problems in selecting an appropriate optical configuration for the illuminator.

This problem is addressed in one prior-art illuminator by including a diode-laser array (or correspondingly an array of light-emitting diodes) having a number of emitters equal to the amount of modulators to be illuminated, and an optical system configured to image each emitter onto a corresponding modulator. This type of illuminator has a disadvantage that it is dependent on all emitters continuing to function. Failure of one emitter could cause at least a reduction in performance of the recording system, for example, a black line on an image in the direction of scanning.

An illuminator arrangement for overcoming this disadvantage is disclosed in U.S. Pat. No. 5,517,359 (Gelbart et al.). Here an optical system is used to project elongated overlapping images of each individual emitter onto a modulator array. The number of emitters need not correspond to the number of modulators, and failure of an individual emitter is described as merely reducing the overall illumination on the modulator rather than effecting the spatial distribution of illumination on the modulator.

An important feature of the Gelbart et al. system is an array of microlenses which are used in forming the elongated images. The microlenses correspond in number to the number of emitters in the diode-laser bar, but are spaced closer together than the emitters in a predetermined ratio of emitter and microlens spacing. It is believed that the requirement for such a microlens array imposes certain cost and manufacturing disadvantages on the illuminator. By way of example, normal manufacturing variations in spacing of both emitters and microlenses could lead to a requirement for matching individual diode-laser bars to individual microlens arrays. Further, even given an appropriately matched diode-laser bar and microlens array, alignment of one with the other may be very difficult. This is because the microlens array must be aligned laterally with respect to the emitters such that the lateral spacing between end ones of the microlenses and arrays is equal. This requirement of course is in addition to a requirement that the microlens array be aligned, parallel to the line of emitters and at the correct distance from the emitters.

There is a need for a diode-laser bar powered illuminator which projects a line of light wherein any point is illuminated about equally by all emitters of the diode laser bar, but which does not require an optical system including an array of microlenses to accomplish this result.

SUMMARY OF THE INVENTION

In one aspect of the present invention, apparatus for projecting a line of light includes a plurality of diode-lasers spaced apart in an elongated linear array. The linear array has a slow axis which is parallel to the length direction of the diode-laser array, and a fast axis perpendicular to the slow axis. Light is emitted from each of the diode-lasers as diverging rays in both the fast and slow axes. The rays are emitted in a general direction of propagation mutually perpendicular to both the fast an slow axes. An optical system is arranged with a longitudinal axis thereof parallel to the propagation direction of light from the diode-lasers. The optical system is arranged to focus the fast-axis diverging rays in a focal plane perpendicular to the longitudinal optical axis, and arranged to form the slow-axis diverging rays into a plurality of bundles of parallel rays, one thereof for each diode-laser. The bundles of parallel rays intersect in the focal plane. The optical system thereby causes light from the diode-lasers to be formed into a line of light in the focal plane. The line of light has a width in the fast axis and a length in the slow axis.

In another aspect of the present invention, the emitting apertures of the diode-laser bars are located in a slow-axis object plane of the optical system and the bundles of parallel rays intersect in a slow-axis exit-pupil of the optical system. Fast axis rays are focussed in the slow-axis exit-pupil thereby providing the line of light. The line of light has a width equal to about the fast-axis focal spot-size and a length about equal to the width of the slow-axis exit-pupil.

In yet another aspect of the present invention, the optical system does not include any microlens arrays wherein individual optical elements operate on rays from corresponding individual diode-lasers. In the inventive optical system, rays from all diode-lasers traverse all optical elements of the optical system.

In still another aspect of the present invention the optical system may include one or more physical stops arranged to prevent selected portions the fast and slow-axis diverging rays from the diode-laser array from reaching the fast-axis focal plane. The selected portions are chosen to optimize the intensity of light distribution along the length of the line of light. In one preferred embodiment, each of the physical stops is an elongated stop formed from a length of optical fiber having a length extending completely through the fast-axis rays from the diode-laser array.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1A:
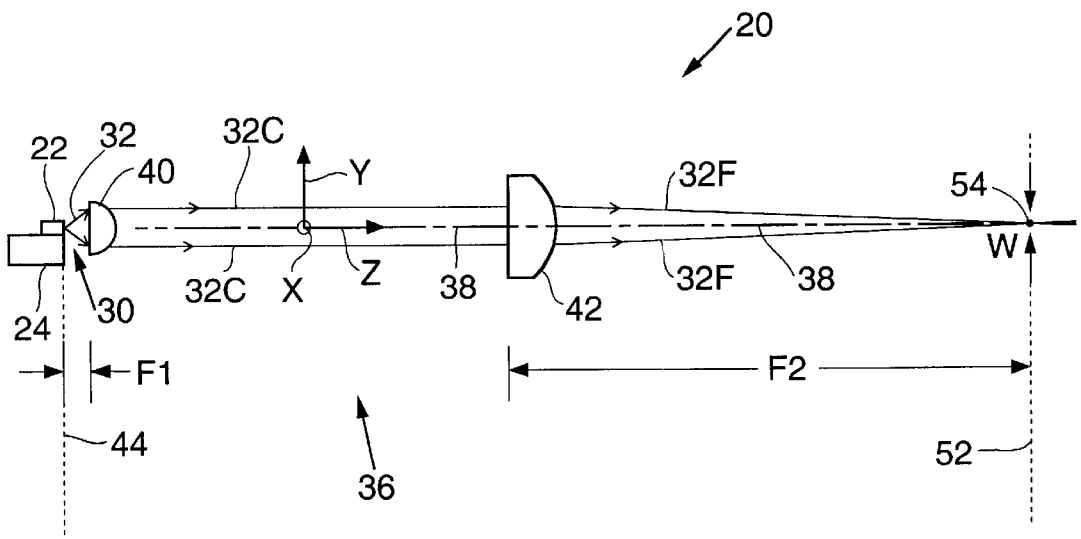
FIGS. 1A and 1B schematically illustrate, in two mutually orthogonal, fast and slow axes, one preferred embodiment of a diode-laser line projector in accordance with the present invention including a diode-laser bar and an optical system for projecting light from the diode-laser bar as a line of light in a fast-axis focal plane of the optical system.
Figure 1B:
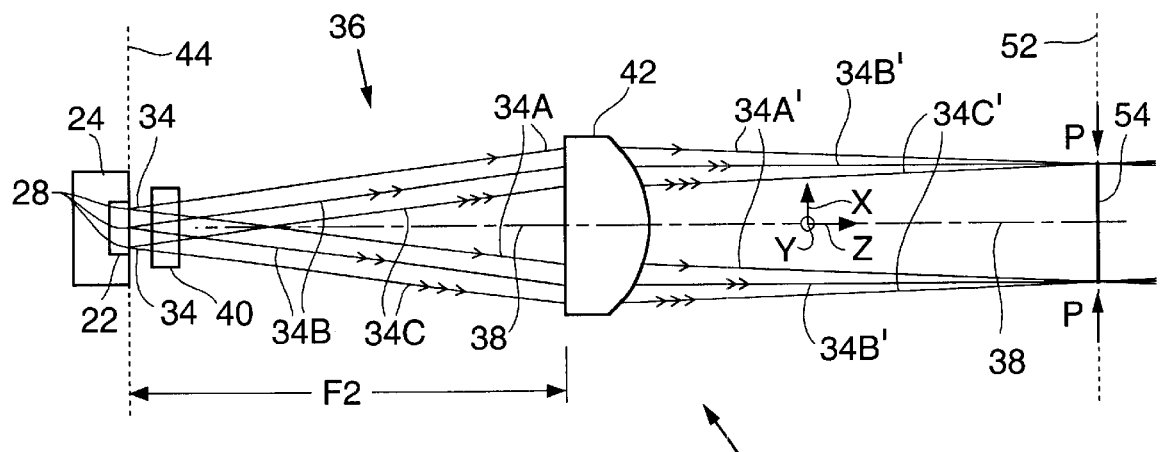
Figure 2:
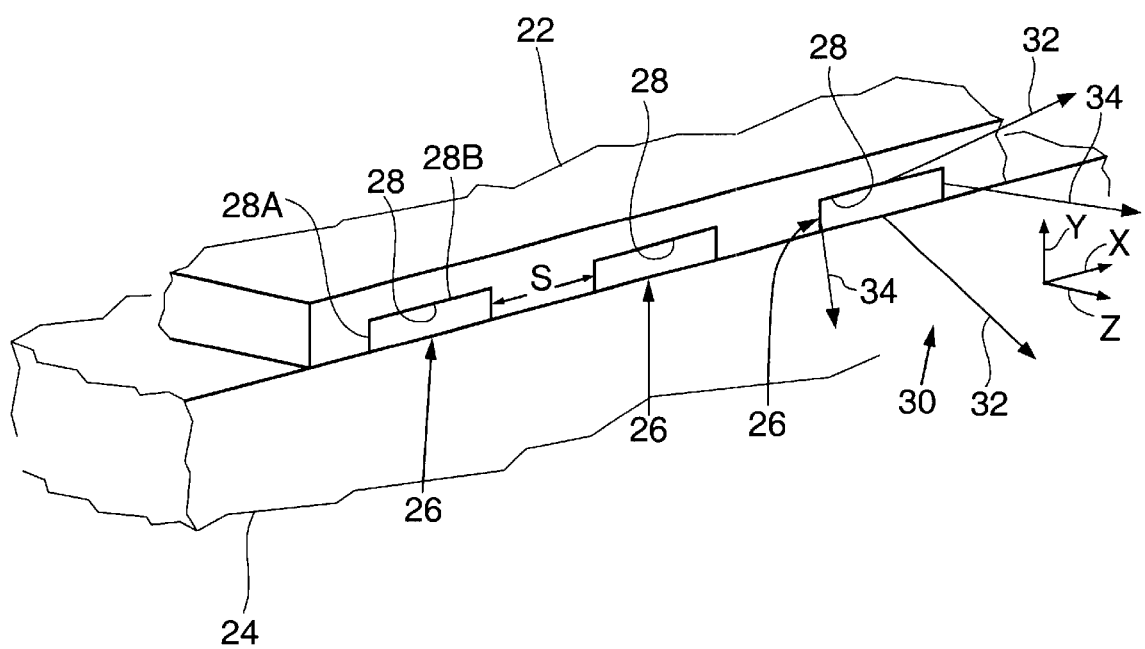
FIG. 2 is a fragmentary perspective view schematically illustrating features of the diode-laser bar of FIG. 1.

Turning now to the drawings, wherein like features are designated by like reference numerals, FIGS. 1A and 1B schematically illustrate a preferred embodiment 20 of a diode-laser line projector in accordance with the present invention. Line projector 20 employs includes as a light-source a diode-laser bar 22, details of which are illustrated in FIG. 2. Diode laser bar 22 is in thermal contact with a heat-sink 24. Diode-laser bar 22 includes a plurality of diode-lasers 26, each thereof having an emitting aperture 28. In a multimode diode-laser bar, these emitting apertures have a height 28A of about 1.0 micrometers ($\mu$m) and a width 28B up about 200.0 $\mu$m. A diode laser bar can be defined as having a fill-factor which is the percentage of the total length of the bar occupied by diode-lasers and is dependent on the width 28B of the diode-lasers and spacing S between diode lasers.

The diode-laser bar (and diode-lasers therein) can also be characterized as having a slow axis X parallel to the width direction of emitting apertures 28, and a fast axis Y perpendicular to slow axis X. Light is emitted from an emitting aperture 28 in a general direction (axis) of propagation Z mutually perpendicular to the fast and slow axes. The light is emitted in the form of a diverging beam 30. Rays 32 of beam 30 in fast axis Y diverge at an included angle of about 32°. Rays 34 of beam 30 in the slow axis X diverge at an included angle of about 7.5°.

Continuing now with reference again to FIGS. 1A and 1B, Line-projector 20 includes an (anamorphic) optical system 36 which has a different optical prescription in the fast axis Y (FIG. 1A) and slow axis X (FIG. 1B). Optical system 36 can be defined as having a longitudinal axis 38 aligned parallel to the general direction of propagation (Z axis) of light from beams 32.

Optical system 36 includes two lenses 40 and 42. Here it should be noted that the term "lens" as used herein is meant to define either a lens consisting of only a single optical element or a lens including two or more optical elements, either air-spaced or optically bonded. Lens 40 has positive optical (dioptric) power in fast axis Y but has zero optical power in slow axis X. Lens 42 has positive optical power in both the fast and slow axes.

Optical system 36 has an object plane 44. This object plane is located at a distance from lens 40 equal to about the effective focal length thereof as indicated by distance F1 in FIG. 1A. Object plane 44 is also located at a distance from lens 42 about equal to an effective focal length thereof as indicated by distance F2 in FIG. 1B. Here it should be noted that these distances F1 and F2 are specified in each case from a principal plane of the lens. Emitting apertures 28 of diode-laser bar 22 are aligned about in object plane 44 of optical system 36.

The relative placement of lens 40 and emitting apertures 28 causes rays 32 leaving the emitting apertures in the fast axis to be collimated, as indicated in FIG. 1A by rays 32C. Collimated fast axis rays are thus incident on lens 42. Lens 42 focuses the fast-axis collimated rays into a focal plane 52 about one effective focal length of lens 42 from lens 42 as indicated by rays 32F in FIG. 1A.

As lens 40 has zero optical power in the slow axis, rays 34 leaving emitting-apertures 28 continue through lens 40 maintaining their original divergence as they are incident on lens 42. Three diverging sets (bundles) of rays 34A, 34C and 34B are depicted in FIG. 1B, representing rays from respectively end ones and center one of emitting apertures 28. These rays are designated by respectively single, triple, and double arrows to facilitate following the rays through optical system 36.

It should be noted here that bundles of rays 34 are designated in FIG. 1B and similar illustrations herein, for simplicity of illustration as coming from a single point. Those skilled in the art will recognize that in fact rays diverge from every resolvable point in an emitting aperture 28. Accordingly, the term bundles of rays emitted by diode-lasers as used in this description and the appended claims is intended to take this into account. The intensity of rays coming from different points in an emitting aperture 28 influences the light intensity distribution along the length of a line of light projected by the optical system. This is discussed further hereinbelow.

Diverging sets or bundles 34A, 34C and 34B of slow-axis rays are formed by lens 42 into corresponding parallel sets of slow-axis rays, designated in FIG. 1B as sets 34A', 34C' and 34B'. Rays 34B' from the central emitting-aperture are parallel to axis 38 of optical system 36. rays 34A' and 34C' are inclined toward axis 38. The sets of rays intersect in fast axis focal-plane 52. The intersection of rays 34A', 34C' and 34B' can be defined as occurring at a slow-axis pupil of optical system 32 designated in FIG. 1B by arrows P. The result of this is that a line of light 54 is formed about in fast-axis focal plane 52. Line 54 has a width W in the fast axis equal to about the fast-axis spot size of rays 32F. Line 54 has a length in the slow axis about equal to the length of slow-axis pupil P.

It should be noted here that the terminology "about in fast-axis focal, plane 52" recognizes that there is a depth of focus associated with the focal plane and that line 54 can be formed anywhere within that depth of focus. Further, those skilled in art will recognize that line of light 54 manifests itself physically when an object to be illuminated (not explicitly shown in FIGS. 1A and 1B) is placed at about the focal plane 52.

The slow-axis arrangement of lens 42 has the advantage that a precise overlap of ray sets 34A', 34C' and 34B' is achieved in fast-axis focal plane 52. As the slow-axis rays do not form an image in pupil P, then light distribution along the length of line 54 is representative of the far-field distribution of each of emitting apertures 28 and provides a relatively high degree of uniformity. As is known in the diode-laser art, the slow axis far-field uniformity from such emitting apertures is dependent on the specific arrangement of layers in the diode-laser and to some extent can be modified by appropriate design of the layers.

Optical system 36 has the advantage that all diode-lasers 26 in diode-laser bar 22 contribute about equally to forming line 54, such that failure of one diode-laser results only in a reduction of overall intensity without a significant change in light distribution along the line. Further, line 54 is formed without the use of any microlens array as used in the above-discussed, prior-art arrangement of Gelbart et al., wherein individual optical elements operate on rays from corresponding individual diode-lasers. In optical-system 36, rays from all diode-lasers, i.e., from all emitting apertures 28, traverse all optical elements of the optical-system.

Figure 3A:
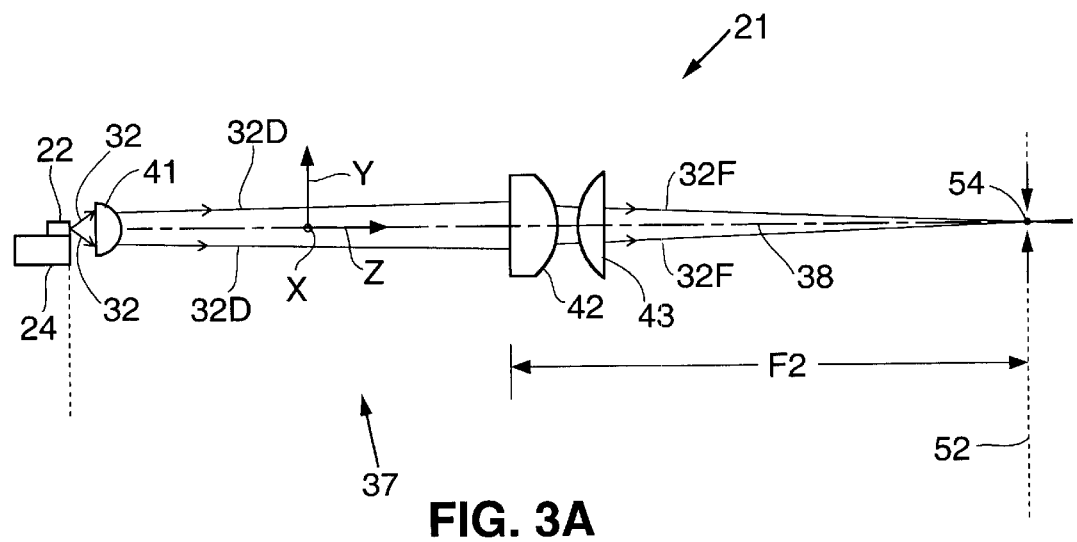
FIGS. 3A and 3B schematically illustrate, in two mutually orthogonal fast and slow axes, another preferred embodiment of a diode-laser line projector in accordance with the present invention for projecting light from a diode-laser bar as a line of light in a fast-axis focal plane of the optical system.
Figure 3B:
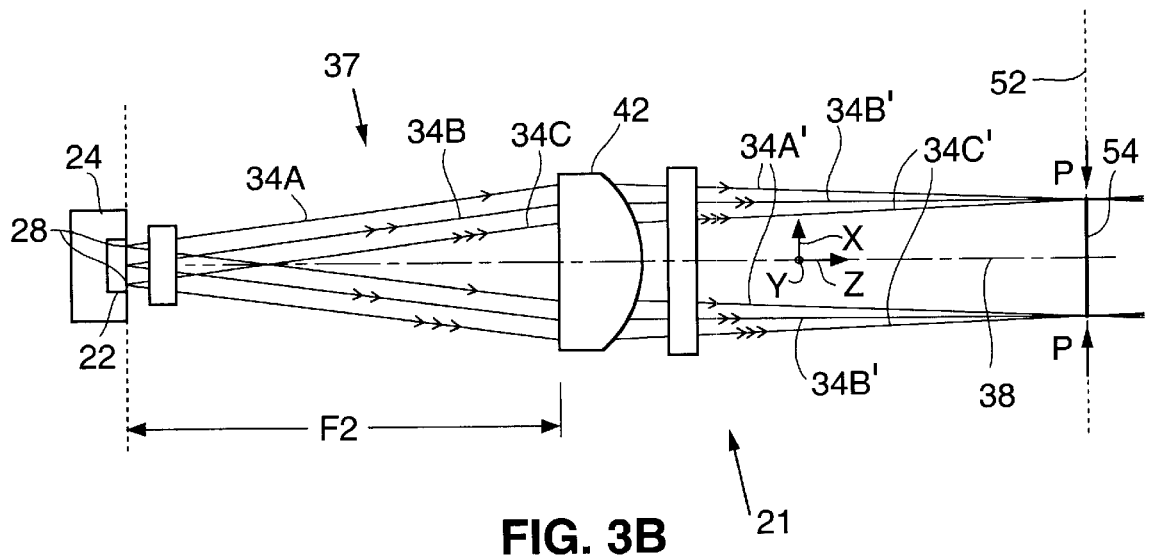

Referring now to FIGS. 3A and 3B, another embodiment 21 of a line-projector in accordance with the present invention is illustrated. Line-projector includes diode-laser bar 22 as discussed above, and an optical system 37 for projecting light from the diode-laser bar into a line 54.

Optical system 37 includes a lens 41 having positive optical power in fast axis Y and zero optical power in slow axis F. This lens, as depicted in FIG. 3A has a longer fast-axis focal length (less fast-axis optical power) than lens 40 of line projector 20 of FIG. 1B. However, this should not be considered as a limiting parameter. Lens 41 is located at a distance less than the focal length thereof from limiting apertures 28 of diode laser bar 22. In this arrangement, the divergence of fast-axis rays 32 is reduced (rays 32D) but the rays are not collimated.

A combination of lens 42 having equal, positive optical power in both the fast and slow axes, and a lens 43 having positive optical-power in the fast axis and zero optical power in the slow axis focuses rays 32D in a plane 52 (see rays 32F). The fast-axis optical power of lenses 41 and 43 and the spacing of these lenses relative to lens 42 and emitting-apertures 28 is selected such that plane 52 in which rays 32 focus is at a distance F2 of about the effective focal length of lens 42 from lens 42. Here it should be noted that the term "optical distance" takes into account the refractive index and thickness of lens 43.

The selection of two cylindrical lenses (41 and 43) in optical system 37 rather than a single lens (40) as used in optical system 36 of FIG. 1A provides for reduced aberrations of the optical system in the fast axis compared with the single lens. Nevertheless, the placement of lens 42 relative to limiting apertures 28 and plane 52 is effectively the same in optical system 37 as in optical system 36 as the additional lens 43 has no slow axis optical power. Accordingly, optical system 37, in the slow axis, functions in the same way as described above for optical system 36 of FIG. 1A. As depicted in FIG. 3B emitting apertures 28 are in a slow axis object plane of optical system 37 spaced from lens 42 by a distance F2 equal to the effective focal length of the lens. Accordingly, parallel bundles 34A', 34C' and 34B' of slow-axis rays formed by lens 42 intersecting in focal plane 52 in a slow axis-pupil of optical system 37. Line of light 54 is formed, as described above for line projector 20 of FIG. 1B with a width W in the fast axis and a length in the slow axis about equal to the width of exit pupil P.

It should be noted here that the particular location of lens 43 on a side of lens 42 furthest from diode-laser bar 22 should not be considered as limiting in the functional arrangement of optical system 37. Those skilled in the art will recognize without further illustration, that the same functional arrangement, i.e., with each lens having the above-described function, can be achieved if lens 43 is located on an opposite side of lens 42. The arrangement of FIGS. 3A and 3B, however, is believed to provide better performance in terms of optical aberrations of optical system 37.

Line-projectors 20 and 21 are described above in terms of a linear arrangement of optical components. In practical examples the length of such a projector wherein the fast axis beam divergence in plane 52 is about 2.0° at the full width at half maximum (FWHM) would have a length of about 160 millimeters (mm) measured from diode laser-bar 22 to the last element in the optical system. Such a length may be impractical for certain applications of the inventive line-projector. The overall physical length of the inventive projector can be reduced, however, while preserving the projector length of the projector, by folding optical axis 38 of the optical system. This allows the projector to be enclosed in a package having about the same dimensions as a conventional fiber array package (FAP) type of diode-laser light source.

Figure 4:
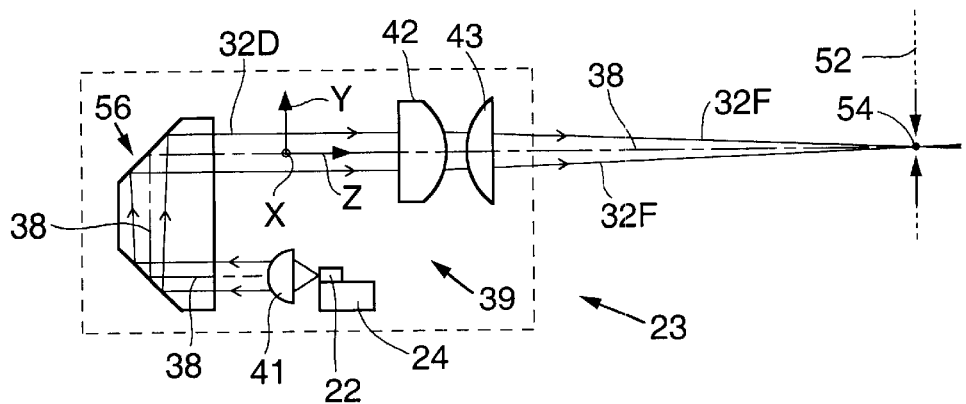
FIG. 4 schematically illustrates, another preferred embodiment of a diode-laser line projector in accordance with the present invention for projecting light from a diode-laser bar as a line of light in a fast axis focal plane of the optical system.

Referring to FIG. 4, an embodiment 23 of a line-projector in accordance with the present invention includes a diode-laser bar 22 and an optical system 39 for projecting light from the diode-laser bar. Optical system 39 includes lenses 41, 42 and 43 configured and arranged as discussed above for optical system 37 of FIGS. 3A and 3B. In optical system 39, optical axis 38 is folded twice by a prism 56. Optical system 39 functions in the same way as optical system 37, providing a line of light 54 in a plane 52 at a distance F2 from lens 42 equal to about the effective focal length of the lens. Line-projector 23 is depicted in FIG. 4 in the fast axis only to avoid repetition. Slow axis optical behavior of the projector is as depicted for the "unfolded" system 21 of FIG. 3B.

A preferred length for diode-laser bar 22 is between about 5.0 and 10.0 mm, preferably about 6.0 mm. A preferred number of diode-lasers (emitters) per bar is between about nineteen and fifty-one, for example about thirty-one. The emitters preferably have a width between about 50.0 and 200.0 $\mu$m for example about 150.0 $\mu$m. Spacing between emitters is preferably between about 200 and 500 $\mu$m, most preferably closer to 200 mm than 500 mm.

In one example of a line-projector 23 in accordance with the present invention, diode-laser bar 22 has a length of about 6.0 mm and includes thirty-one diode-lasers. Emitting-apertures 28 of the diode-lasers have a height of about 1.0 $\mu$m and a width of about 150.0 $\mu$m. The diode-lasers are spaced apart by a distance of about 200 $\mu$m. Fast and slow axis divergences of rays from the emitting apertures are respectively about 32° FWHM and 7.5° included angle.

Lens 41 is a cylindrical plano-convex lens having a fast-axis focal length of about 275.0 $\mu$m. Lens 41 is located at about 75.0 μm from emitting apertures 28. Lens 42 is a plano-convex, biaxially symmetric lens having an effective focal length of about 150.0 mm. Lens 43 is a cylindrical plano-convex lens having a fast-axis focal length of about 150.0 mm. Lens 43 is spaced apart from lens 42 by a distance of about 150.0 mm. The term "cylindrical lens" is intended here as is common in the art to simply define a lens having optical power in one axis only and should not be literally interpreted.

Optical axis 38 is folded by a right-angle prism. Diode-laser bar 22, heat-sink 24 and all optical components of optical system 39 are housed in a package having dimensions of about 13.7 cm×9.7 cm×6.6 cm.

Line 54 projected by the system in fast-axis focal plane 52 has a width of about 75.0 μm measured across the $1/e^2$ points, and a length of about 20.0 mm. Beam divergence at line 54 is about 2.0° FWHM in the fast axis and 3.5° FWHM in the slow axis. As the depth of field of the beam overlap at focal plane 52 is between about ±10.0 and 20.0 mm of focal plane 52 there is some scope for varying the width of line 54 by placing an object or surface to be illuminated in a plane within the focal depth around focal plane 52.

Figure 5:
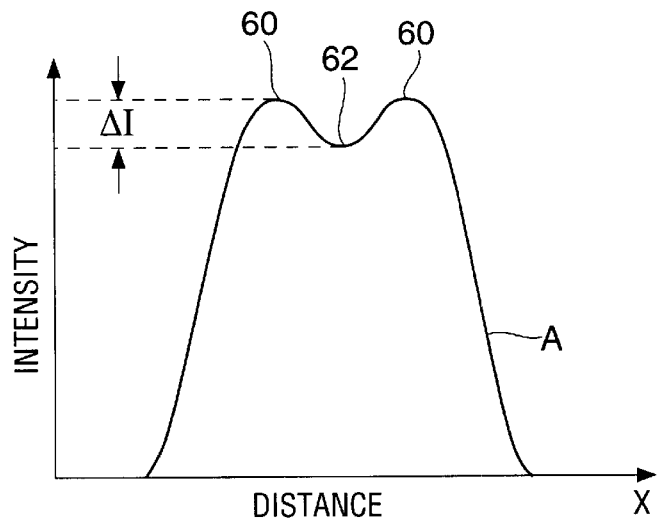
FIG. 5 is a graph schematically illustrating light intensity distribution along a line of light projected in a fast-axis focal plane of the optical system of any of the diode-laser line projectors of FIGS. 1A–B, 3A–B and 4.

In any of the above-described embodiments 20, 21 and 23 by diode laser line projector in accordance with the present invention, the intensity distribution along the length of line of light 54 in focal plane 52 will be as depicted schematically in FIG. 5, by curve A here, the distribution is characterized by two peaks 60 distributed more or less symmetrically about trough 62. This is essentially the same distribution form as contributed by any individual emitted 28 in diode-laser bar 22. The individual contributions exactly overlapped in fast axis focal plane 52. Accordingly the distribution form of the sum is essentially the same as that of the individual contributions thereto. The peak-to-valley variation of intensity ΔI is about twenty percent of peak intensity. While this variation is tolerable in many applications of the inventive line projector, there is some advantage to be gained from the light intensity distribution having a flatter top.

Figure 6A:
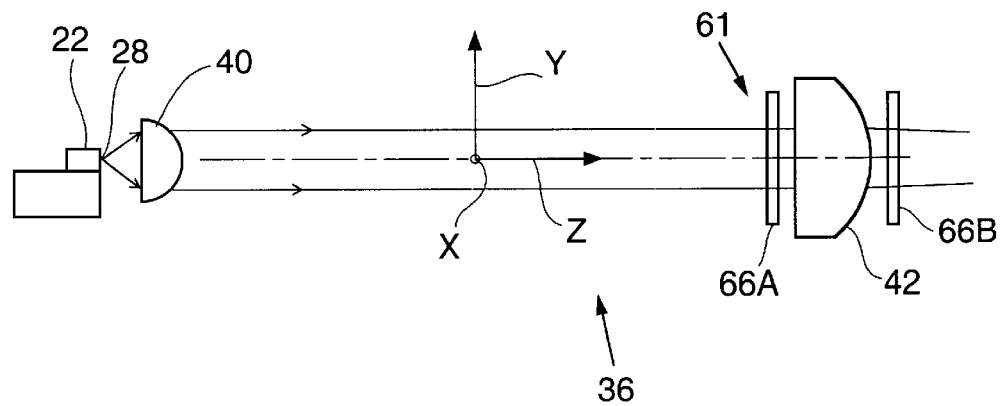
FIGS. 6A and 6B schematically illustrate one example of an intensity distribution flattening arrangement for use in any of the diode-laser line projectors of FIGS. 1A–B, 3A–B and 4.
Figure 6B:
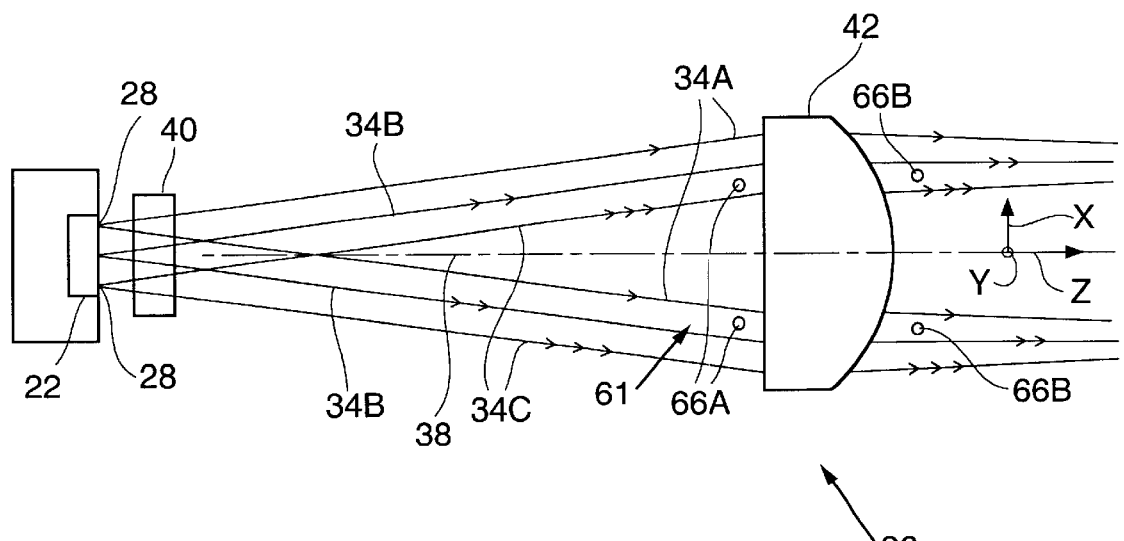

One arrangement 61 for achieving such a flat-top intensity distribution in the inventive line projector is illustrated in FIGS. 6A and 6B, as applied to optical system 36 of diode-laser line projector 21 of FIGS. 3A and 3B. Here, elongated narrow obstructions or stops 66A and 66B, which may be formed conveniently from length of wire, or optical fiber, are placed in the path of light from images of diode laser bar 22, preferably close to biaxially symmetrical, condenser lens 42. The stops may be placed on the side of lens 42 closest diode-laser bar 22 (see stops 66A) or on the side of lens 42 furthest from diode-laser bar 22 (see stops 66B). This position is chosen, inter alia, such that the stops are placed proximate the widest portion in the slow axis of diverging light rays 34 from diode-laser 22. The diameter or width of stops 36 is preferably selected such that less than about ten percent of the total light from the diode-laser bar is obstructed.

Figure 7A:
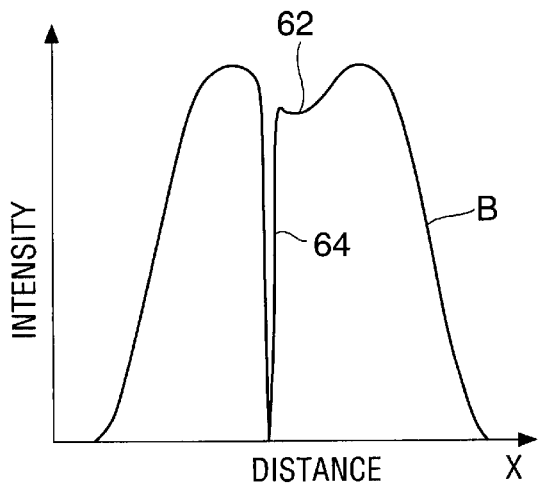
FIGS. 7A and 7B are graphs schematically illustrating the effect of the intensity distribution flattening arrangement of FIG. 6 on the intensity distribution contribution of individual emitters of a diode-laser bar in any of the diode-laser line projectors of FIGS. 1A–B, 3A–B and 4.
Figure 7B:
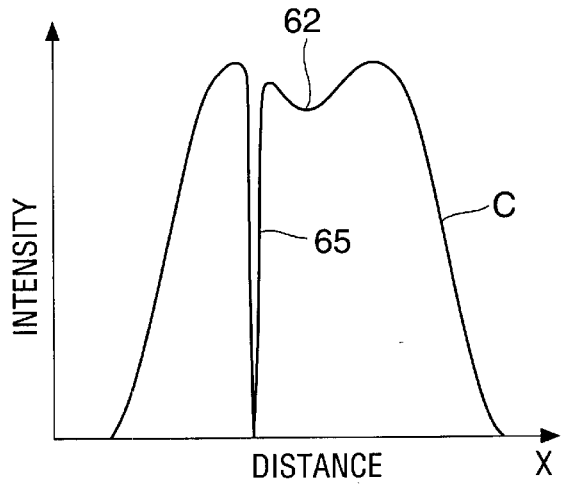

In FIGS. 7 and 7B, the effect of the stops on the light intensity contribution of individual emitters is schematically depicted. In FIG. 7A, curve B schematically depicts the effect of one stop 66A on diverging rays from an end one of emitters 28. A narrow region of light 64 near trough 62 is excluded from the intensity distribution. In FIG. 7B, curve C schematically depicts the effect of the same stop 66A on diverging rays from an opposite end one of emitters 28. Here a narrow region of light 65 further from trough 62 than region 64 is excluded. Those skilled in the art will recognize without further illustration that, in a similar manner, the other one of stops 66A will exclude similar narrow light regions from the opposite side of trough 62. The effect of stops 66B will be essentially the same as that of stops 66A.

Figure 8:
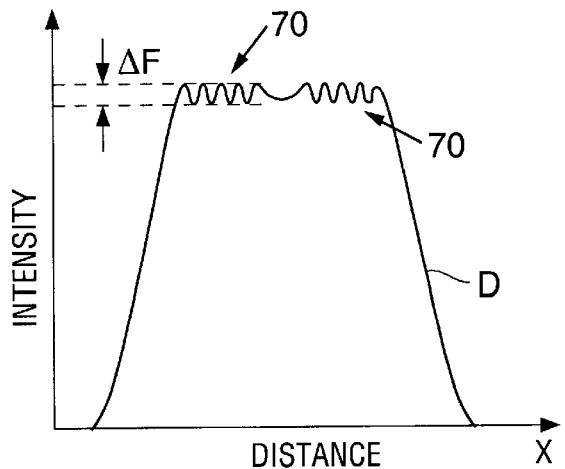
FIG. 8 is a graph schematically illustrating the effect of the intensity distribution flattening arrangement of FIG. 6 on the intensity distribution along a line of light projected in a fast-axis focal plane of the optical system of any of the diode-laser line projectors of FIGS. 1A–B, 3A–B and 4.

When the contributions from each emitter, each with a region obscured, are summed in fast-axis focal plane 52, the intensity distribution resulting from the summation will appear as schematically depicted by curve D in FIG. 8. The number of fluctuations 70 in the intensity profile of curve D and the distance between fluctuations is determined by the number of emitters 28 in diode-laser bar 22. Using this technique it is possible to reduce the intensity fluctuation in line 54 to about ten percent or less.

Preferably the diameter or width of a stop 66 should be about 5% of the total slow-axis width of all bundles of rays 34 at lens 42. By way of example in a projector in accordance with the above-described example, two 540 μm micrometer diameter fibers 66A placed at a distance of about 30% of the total slow-axis width of beams 34 from axis 38 on opposite sides thereof provided a peak-to-valley variation ΔF of between about 5.0 and 10.0 percent. Loss of total light in the projected line is limited to about ten to fifteen percent. This has been found to be tolerable in view of the improved uniformity obtained. It should be noted here that while the intensity distribution flattening arrangement of FIG. 7 is described as applied to optical system 36, this and like arrangements are applicable to any line projection system in accordance with the present invention.

The present invention is described above with reference to a preferred and other embodiments. The invention is not limited, however, those embodiments described and depicted herein. Rather, the invention is limited only by the claims appended hereto.

What is claimed is:

1. An illumination system for projecting a line of light, comprising:

a plurality of diode-lasers spaced apart in an elongated linear array, said linear array having a slow axis parallel to the length direction thereof, and a fast axis perpendicular to said slow axis, light being emitted from each of said diode-lasers as diverging rays in both said fast and slow axes in a direction of propagation perpendicular to both said fast and slow axes; and an optical system having a longitudinal axis parallel to the propagation direction of light from said diode-lasers, said optical system arranged to focus said fast-axis diverging rays in a focal plane perpendicular to said longitudinal optical axis, and arranged to form said slow axis diverging rays into a plurality of bundles of parallel rays, one thereof for each diode-laser, said bundles of parallel rays intersecting in said focal plane, whereby light from said diode-lasers is formed into a line of light about in said focal plane, said line of light having a width in said fast axis and a length in said slow axis.

2. The illumination system of claim 1, wherein said optical system is a system of optical elements, and each element is said optical system is traversed by said fast and slow axis diverging rays of all optical elements.

3. The illumination system of claim 1, wherein said optical system includes first and second lenses, said first lens closest to said diode-laser array and having zero optical power in said slow axis and positive optical power in said fast axis and said second lens having equal positive optical power in said fast axis and said slow axis.

4. The illumination system of claim 3, wherein said first lens is arranged to collimate said diverging rays in said fast axis and said second lens is arranged to focus said collimated fast-axis rays into said fast-axis focal plane and to form said intersecting bundles of parallel rays from said slow-axis diverging rays of said diode-laser array.

5. The illumination system of claim 3, further including a third lens, and wherein said first lens is arranged to reduce the fast-axis divergence of said fast-axis diverging rays, said second and third lenses are arranged to focus said reduced-divergence fast-axis rays into said fast-axis focal plane, and said third lens is arranged to form said slow-axis diverging rays into said intersecting parallel bundles of rays.

6. The illumination system of claim 5, wherein said third lens is located on a side on a side of said second lens opposite said diode-laser array.

7. The illumination system of claim 3, further including one or more physical stops arranged to prevent selected portions said fast and slow-axis diverging rays from said diode-laser array from reaching said fast-axis focal plane, said selected portions being chosen to optimize the intensity of light distribution in said line of light along said length thereof.

8. The illumination system of claim 3, wherein said one or more physical stops is located proximate said second lens.

9. The illumination system of claim 8, wherein at least one of said one or more physical stops is located proximate a side of said second lens closest to said diode-laser array.

10. The illumination system of claim 8, wherein at least one of said one or more physical stops is located proximate a side of said second lens furthest from said diode-laser array.

11. The illumination system of claim 3, wherein said longitudinal axis is folded by an optical element located between said first and second lenses.

12. The illumination system of claim 11, wherein said optical element is a right-angle prism.

13. The illumination system of claim 1, further including at least one physical stop arranged to prevent selected portions of said fast and slow-axis diverging rays from said diode-laser array from reaching said fast-axis focal plane, said selected portions being chosen to optimize the intensity of light distribution in said line of light along said length thereof.

14. The illumination system of claim 13, wherein there are at least two of said physical stops located on opposite sides of said longitudinal axis of said optical system in a slow-axis plane thereof.

15. The illumination system of claim 13, wherein each of said one or more physical stops is an elongated stop having a length extending completely through said fast-axis rays from said diode-laser array.

16. The illumination system of claim 15, wherein said physical stops are formed from a length of optical fiber.

17. An illumination system for projecting a line of light, comprising:

a diode-laser bar and an anamorphic optical system for projecting light from said diode laser bar;

said laser bar including a plurality of diode-lasers spaced apart in an elongated linear array, each of said diode-lasers having an emitting aperture, and said linear array having a slow axis parallel to the length direction thereof, and a fast axis perpendicular to said slow axis;

said optical system having a first optical configuration for said fast axis and a second optical configuration for said slow axis and having an object plane common to both configurations, said emitting apertures of said diode-lasers being located in said object plane; and wherein said second optical configuration is selected such that light emitted by said emitting-apertures in said slow axis is directed by said optical system in the form of converging parallel beams overlapping in a slow-axis exit-pupil of said optical system, and said first optical configuration is selected such that light emitted by said emitting-apertures in said fast-axis is focussed in said slow-axis exit-pupil, whereby a line of light is formed in said exit pupil, said line of light having a width in said fast axis and a length in said slow axis.

18. An illumination system for projecting a line of light, comprising:

a plurality of diode-lasers spaced apart in an elongated linear array, said linear array having a slow axis parallel to the length direction thereof, and a fast axis perpendicular to said slow axis, light being emitted from each of said diode-lasers as diverging rays in both said fast and slow axes in a direction of propagation perpendicular to both said fast and slow axes;

an optical system including two or more lenses having a longitudinal axis parallel to the propagation direction of light from said diode-lasers, said optical system arranged to focus said fast-axis diverging rays in a focal plane perpendicular to said longitudinal optical axis, and arranged to form said slow-axis diverging rays into a plurality of bundles of parallel rays, one thereof for each diode-laser, said bundles of parallel rays intersecting in said focal plane, whereby light from said diode-lasers is formed into a line of light about in said focal plane, said line of light having a width in said fast axis and a length in said slow axis; and wherein all lenses of said optical system are traversed by rays emitted from all of said plurality of diode-lasers.

* * * * *